(12) United States Patent
Kawaguchi (10) Patent No.: US 11,995,536 B2
(45) Date of Patent: May 28, 2024

(54) LEARNING DEVICE, ESTIMATING DEVICE, ESTIMATING SYSTEM, LEARNING METHOD, ESTIMATING METHOD, AND STORAGE MEDIUM TO ESTIMATE A STATE OF VEHICLE-OCCUPANT WITH RESPECT TO VEHICLE EQUIPMENT

(71) Applicant: Panasonic Intellectual Property Management Co., Ltd., Osaka (JP)

(72) Inventor: Kyoko Kawaguchi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1549 days.

(21) Appl. No.: 15/830,239

(22) Filed: Dec. 4, 2017

(65) Prior Publication Data

US 2018/0232636 A1     Aug. 16, 2018

(30) Foreign Application Priority Data

Feb. 16, 2017     (JP) ................................ 2017-027224

(51) Int. Cl.
*G06N 3/08*     (2023.01)
*B60W 40/00*     (2006.01)
(Continued)

(52) U.S. Cl.
CPC ............... *G06N 3/08* (2013.01); *B60W 40/00* (2013.01); *G06F 18/217* (2023.01);
(Continued)

(58) Field of Classification Search
CPC ............ G06N 3/08; G06N 3/04; G06N 3/063; G06N 3/082; G06N 20/00
(Continued)

(56) References Cited

U.S. PATENT DOCUMENTS 11,423,671 B1 * 8/2022 Chan ........................ G06T 7/20
2009/0278915 A1   11/2009 Kramer et al.
(Continued)

FOREIGN PATENT DOCUMENTS

JP     2014-179097     9/2014
JP     2014-221636     11/2014

OTHER PUBLICATIONS

Yan, C. (Mar. 2016). Vision-based driver behaviour analysis. Semantic Scholar | AI-Powered Research Tool. https://www.semanticscholar.org/paper/Vision-based-driver-behaviour-analysis-Yan/a31cba7f8b85ca5abb4750ccbde220d4065e66fb (Year: 2016).*

(Continued)

*Primary Examiner* — Viker A Lamardo
(74) *Attorney, Agent, or Firm* — GREENBLUM & BERNSTEIN, P.L.C.

(57) ABSTRACT

A learning device includes an input section and a learning section. The input section obtains training data in which an image containing an image of equipment of a vehicle, first information indicating a skeleton location of a specific part of a vehicle-occupant, and second information indicating a state of the vehicle-occupant with respect to the equipment are associated with each other. The learning section forms a model such that an estimating device can obtain the first information and the second information associated with the image containing the image of the equipment.

11 Claims, 6 Drawing Sheets

(51) Int. Cl.
*G06F 18/21* (2023.01)
*G06F 18/2413* (2023.01)
*G06V 10/34* (2022.01)
*G06V 10/44* (2022.01)
*G06V 10/764* (2022.01)
*G06V 10/776* (2022.01)
*G06V 10/82* (2022.01)
*G06V 20/59* (2022.01)
*G06V 40/10* (2022.01)

(52) U.S. Cl.
CPC ........ *G06F 18/24143* (2023.01); *G06V 10/34* (2022.01); *G06V 10/44* (2022.01); *G06V 10/764* (2022.01); *G06V 10/776* (2022.01); *G06V 10/82* (2022.01); *G06V 20/597* (2022.01); *G06V 40/107* (2022.01)

(58) Field of Classification Search
USPC .......................................................... 706/25
See application file for complete search history.

(56) References Cited

U.S. PATENT DOCUMENTS

| | | | |
|---|---|---|---|
| 2013/0261871 A1* | 10/2013 | Hobbs | G06V 40/28 701/1 |
| 2014/0282259 A1 | 9/2014 | Fujimura et al. | |
| 2018/0229725 A1* | 8/2018 | Akama | B60W 40/00 |
| 2019/0071101 A1* | 3/2019 | Emura | G05D 1/0088 |

OTHER PUBLICATIONS

Craye, C. (Feb. 1, 2015). Driver distraction detection and recognition using RGB-D sensor. Semantic Scholar | AI-Powered Research Tool. https://www.semanticscholar.org/paper/Driver-distraction-detection-and-recognition-using-Craye-Karray/75b7f57674d5d39aaeda11a674279490049dc5b4 (Year: 2015).*

* cited by examiner

FIG. 2

SLI: skeleton location information
PRI: positional relation information

SLI: (x1,y1)
PRI: OFF

FIG. 4B

SLI: (x2,y2)
PRI: OFF

FIG. 4C

SLI: (x3,y3)
PRI: ON

FIG. 4D

SLI: (x1,y1)
PRI: OFF

FIG. 4E

SLI: (x2,y2)
PRI: ON

FIG. 4F

SLI: (x3,y3)
PRI: OFF

FIG. 4G

SLI: (x1,y1)
PRI: ON

FIG. 4H

SLI: (x2,y2)
PRI: OFF

FIG. 4I

SLI: (x3,y3)
PRI: OFF

SLI: skeleton location information
PRI: positional relation information

LEARNING DEVICE, ESTIMATING DEVICE, ESTIMATING SYSTEM, LEARNING METHOD, ESTIMATING METHOD, AND STORAGE MEDIUM TO ESTIMATE A STATE OF VEHICLE-OCCUPANT WITH RESPECT TO VEHICLE EQUIPMENT

BACKGROUND

1. Technical Field

The present disclosure relates to a learning device, an estimating device, an estimating system, a learning method, and an estimating method, which estimate a state (posture and action with respect to the equipment in an interior of vehicle) of a vehicle-occupant (e.g. driver). It also relates to a storage medium that stores a learning program or an estimating program.

2. Description of the Related Art

In recent years information-providing techniques useful for vehicle-occupants in mobile devices (e.g. in an interior of a vehicle such as a car) have been developed. These techniques sense the state of the vehicle-occupant (action or gesture) in the mobile device, and provide the vehicle-occupant with useful information based on the result of sensing. These techniques are disclosed in Unexamined Japanese Patent Publications No. 2014-221636, and No. 2014-179097, for example.

SUMMARY

The present disclosure provides a learning device, an estimating device, an estimating system, a learning method, and an estimating method, which allow estimating accurately a state of a vehicle-occupant with respect to the equipment in the vehicle regardless of the specification of vehicles. It also provides a storage medium that stores a learning program or an estimating program.

The learning device of the present disclosure forms a model to be used in the estimating device that estimates the state of the vehicle-occupant with respect to the equipment in the vehicle. This learning device includes an input section and a learning section. The input section obtains training data in which an image, first information, and second information are associated with each other. The image contains an image of the equipment of the vehicle. The first information indicates a skeleton location of a specific part of the vehicle-occupant, and the second information indicates the state of the vehicle-occupant with respect to the equipment. The learning section forms the model so that the estimating device can obtain the first and the second information associated with the image containing the image of the equipment.

The estimating device of the present disclosure estimates a state of a vehicle-occupant with respect to equipment of a vehicle. This estimating device includes a storage section and a processing section. The storage section stores a model formed by the learning device. The processing section obtains an image containing an image of the equipment, then estimates the state of the vehicle-occupant based on the image and the model stored in the storage section. The processing section then outputs the first and the second information as an estimating result.

The estimating system of the present disclosure estimates a state of a vehicle-occupant with respect to equipment of a vehicle. This system includes a camera configured to shoot an image containing an image of the equipment, and the estimating device discussed above. The processing section of the estimating device obtains the image containing the image of the equipment from the camera.

The learning method of the present disclosure forms a model to be used in an estimating method for estimating a state of a vehicle-occupant with respect to equipment in a vehicle. According to the learning method, training data is obtained. In the training data, an image, first information, and second information are associated with each other. The image contains an image of the equipment in the vehicle. The first information indicates a skeleton location of a specific part of the vehicle-occupant, and the second information indicates the state of the vehicle-occupant with respect to the equipment. The learning method forms a model so that the first information and the second information associated with the image containing the image of the equipment are obtainable in the estimating method.

The estimating method of the present disclosure estimates a state of a vehicle-occupant with respect to equipment of a vehicle. According to the estimating method, the image containing an image of the equipment is obtained in the first place. Then, the state of the vehicle-occupant with respect to the equipment is estimated by using the obtained image and the model formed by the learning method. Furthermore, the first information and the second information are output as an estimating result.

The storage medium of the present disclosure, to be more specific, a non-transitory computer readable medium stores a learning program that is to be executed by a computer of a learning device that forms a model to be used in an estimating device for estimating a state of a vehicle-occupant with respect to equipment in a vehicle. This learning program causes the computer to execute a process obtaining training data, and a process of forming the model. In the training data, an image, first information, and second information are associated with each other. The image contains an image of the equipment. The first information indicates a skeleton location of a specific part of the vehicle-occupant, and the second information indicates the state of the vehicle-occupant with respect to the equipment. The model is formed so that the estimating device can obtain the first and the second information associated with the image.

The storage medium, to be more specific, a non-transitory computer readable medium, of the present disclosure stores an estimating program to be executed by the computer of an estimating device that estimates a state of a vehicle-occupant with respect to equipment of a vehicle. This estimating program causes the computer to execute a process of obtaining an image, a process of estimating the state of the vehicle-occupant with respect to the equipment, and a process of outputting first and the second information as an estimating result. The obtained image contains an image of the equipment. In the process of estimating the state of the vehicle-occupant, the obtained image and a model formed by a learning program stored in the non-transitory computer readable medium are used. The first information indicates a skeleton location of a specific part of the vehicle-occupant, and the second information indicates the state of the vehicle-occupant with respect to the equipment.

The present disclosure is applicable to any vehicles regardless of their specifications, and is able to accurately estimate the state of the vehicle-occupant with respect to the equipment.

DETAILED DESCRIPTION OF PREFERRED EMBODIMENTS

Prior to the description of the embodiment of the present disclosure, the origin of the present disclosure is explained.

An on-vehicle camera equipped in a car-interior shoots an image of a vehicle-occupant, and a state of this vehicle-occupant can be estimated based on this image. With this kind of an estimating device, a skeleton location of a specific part of vehicle-occupant can be estimated from the image, and the state of the vehicle-occupant with respect to the equipment can be estimated based on this skeleton location. For instance, based on a skeleton location of the vehicle-occupant's hand, which is a specific part of the vehicle-occupant, the state of the vehicle-occupant (e.g. holding the steering wheel, or operating a navigation system) can be estimated. The state of the vehicle-occupant with respect to the equipment can be expressed in a positional relation between the equipment and the specific part of the vehicle-occupant.

The skeleton location can be estimated, for instance, by using a model formed by a machine learning (algorithm) A model formed by a deep learning, in particular, allows estimating the skeleton location with higher accuracy, so that this model is best suited to this application. The deep learning refers to a machine learning using a neural network.

Figure 1:
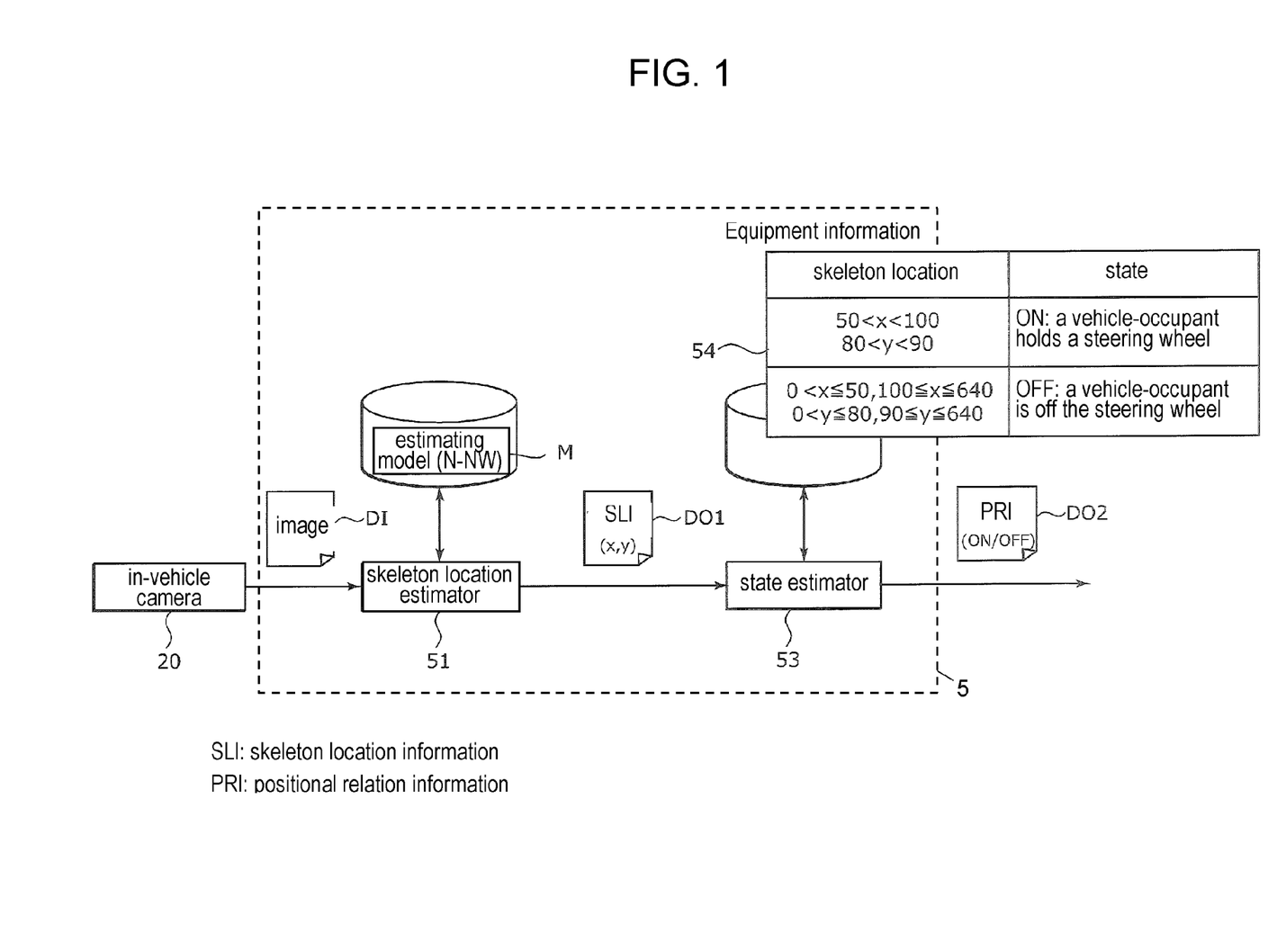
FIG. 1 shows a structure of an example of an estimating device.

FIG. 1 shows a structure of estimating device 5 as an example. An estimation done by estimating device 5 about a state of a steering wheel held by a vehicle-occupant is demonstrated hereinafter. Estimating device 5 includes skeleton-location estimator 51 (hereinafter referred to as first estimator 51) and state estimator 53 (hereinafter referred to as second estimator 53).

First estimator 51 uses an estimating model M for estimating a skeleton location of a vehicle-occupant's specific part (e.g. hand) contained in image DI that has been shot by and supplied from on-vehicle camera 20, and outputs the information of the skeleton location information DO1 (first information). The estimating model M is formed by a machine learning that uses training data (referred to also as teacher data) in which an image (problem) to be input is associated with a skeleton location (answer) to be output. First information DO1 is given as coordinates (x, y) indicating the skeleton location of the vehicle-occupant's specific part shown in image DI.

Second estimator 53 estimates, for instance, the state of a steering wheel (not shown) held by the vehicle-occupant based on first information DO1 supplied from first estimator 51 and equipment information 54 of the vehicle, and then outputs positional relation information DO2 (second information) about the holding state of the steering wheel. In this case, the equipment of the vehicle refers to the steering wheel. Equipment information 54 refers to, for instance, a determination table in which the skeleton location is associated with the state with respect to the equipment. The state with respect to the equipment refers to, to be more specific, whether or not the vehicle-occupant holds the steering wheel. Equipment information 54 shown in FIG. 1 has such settings as ON: it is determined that the vehicle-occupant holds the steering wheel with his/her hand, and OFF: it is determined that the vehicle-occupant is off the steering wheel. To be more specific, second estimator 53 estimates: when skeleton location coordinates (x, y) fall within the range of 50<x<100 and 80<y<90, the vehicle-occupant holds the steering wheel, and when skeleton location coordinates (x, y) fall outside the above ranges, the vehicle-occupant does not hold the steering wheel.

Nevertheless, in order for estimating device 5 to accurately estimate the state of the vehicle-occupant with respect to the equipment, equipment information 54 represented in the determination table should be prepared in response to the specification of the vehicle in which estimating device 5 is mounted. A huge amount of equipment information 54 is thus needed for covering all the models manufactured by all the vehicle makers. On top of that, new models will be available in the market, so that the preparation for the equipment information discussed above is not realistic. If some users modify the equipment, the estimation accuracy will lower.

An exemplary embodiment of the present disclosure is detailed hereinafter with reference to the accompanying drawings.

Figure 2:
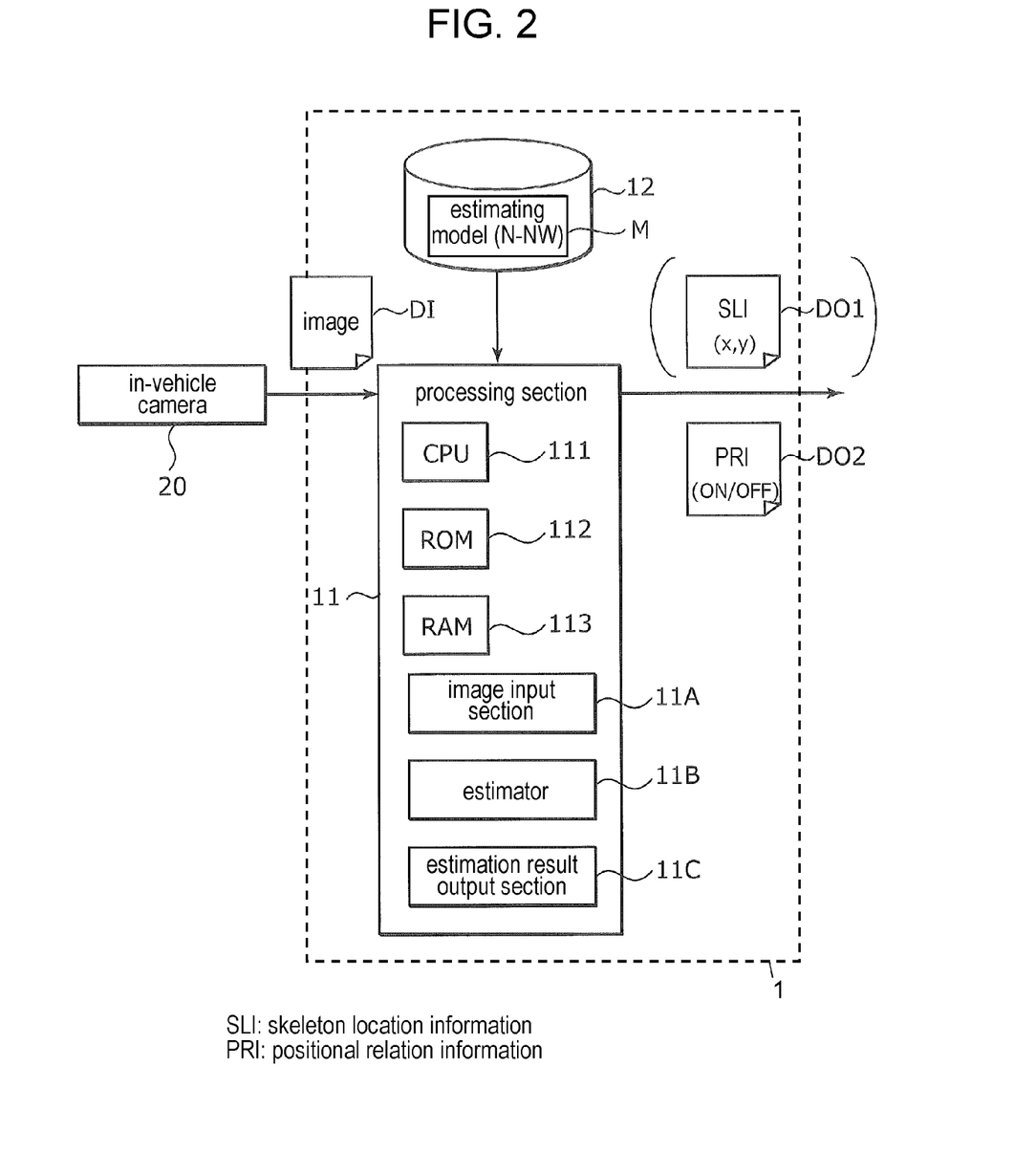
FIG. 2 shows an estimating device in accordance with an embodiment of the present disclosure.

FIG. 2 shows a structure of estimating device 1 in accordance with an embodiment of the present disclosure.

Estimating device 1 is mounted to a vehicle, and based on image DI shot with in-vehicle camera 20 and containing an image of equipment of the vehicle, estimates a state (posture or action) of a vehicle-occupant with respect to the equipment.

In-vehicle camera 20 is, for instance, an infrared camera disposed in the interior of the vehicle, and shoots a region including the object equipment for estimating the state of the vehicle-occupant. In the case that estimating device 1 estimates a holding state of the steering wheel by vehicle-occupant, for instance, in-vehicle camera 20 is set so that camera 20 can shoot the steering wheel within its shooting region.

The equipment of the vehicle includes a steering wheel, a touch panel of a car navigation system, windows, door handles, a control panel for an air-conditioner, a rear-view mirror, a dashboard, seats, arm-rests, a center compartment, and a glove compartment. Although they are different in size and specific location depending on vehicle models, the location of each of the equipment are roughly determined within some region in vehicles regardless of models.

As FIG. 2 shows, estimating device 1 includes processing section 11 and storage section 12.

Processing section 11 includes CPU (central processing unit, serving as a processor) 111 working as computation/control device, ROM (read only memory) 112 working as a main storage device, and RAM (random access memory) 113. ROM 112 stores a basic program called BIOS (basic input output system) and basic setting data. CPU 111 reads a program from ROM 112 or storage section 12 in response to a processing content, and then develops the program in RAM 113 for executing the developed program, thereby executing a given process.

Processing section 11, for instance, execute the estimating program, thereby working as image input section 11A, estimator 11B, and estimation result output section 11C. To be more specific, processing section 11 obtains image DI in which the equipment of the vehicle (e.g. steering wheel) is shot, and estimates the state of the vehicle-occupant with respect the equipment based on image DI and estimating model M, then outputs an estimation result. The state of the vehicle-occupant with respect to the equipment is, for instance, a state of holding the steering wheel. The functions of image input section 11A, estimator 11B, and estimation result output section 11C will be detailed with reference to the flowchart shown in FIG. 6.

Storage section 12 is an auxiliary storage device such as HDD (hard disk drive), or SSD (solid state drive). Storage section 12 can be a disc drive that drives an optical disc such as a CD (compact disc), DVD (digital versatile disc) or an MO (magneto-optical disc) to read/write information. Storage section 12 can be also a memory card including such as a USB memory, or an SD card.

Storage section 12 stores, for instance, an operating system (OS), the estimating program, and estimating model M. The estimating program can be stored in ROM 112. The estimating program is provided via a non-transitory portable and computer readable storage medium (e.g. optical disc, magneto-optical disc, or memory card) that has stored the program. The estimating program can be also supplied by being downloaded from a server via a network. Estimating model M can be stored in ROM 112, or can be supplied via a portable storage medium or a network.

Estimating model M is an algorithm formed by machine learning, and outputs first information and second information with respect to an input of an image containing the image of the equipment. The first information is skeleton location information that indicates a skeleton location of a specific part of a vehicle-occupant. The second information is a positional relation information that indicates a positional relation between the equipment and the specific part of the vehicle-occupant. Estimating model M is preferably formed by a deep learning that uses a neural network. Estimating model M thus formed has the following advantageous features: higher performance of image recognition, and more accurate estimation of the positional relation between the equipment and the specific part of the vehicle-occupant. Estimating model M is formed, for instance, by learning device 2 shown in FIG. 3.

Figure 3:
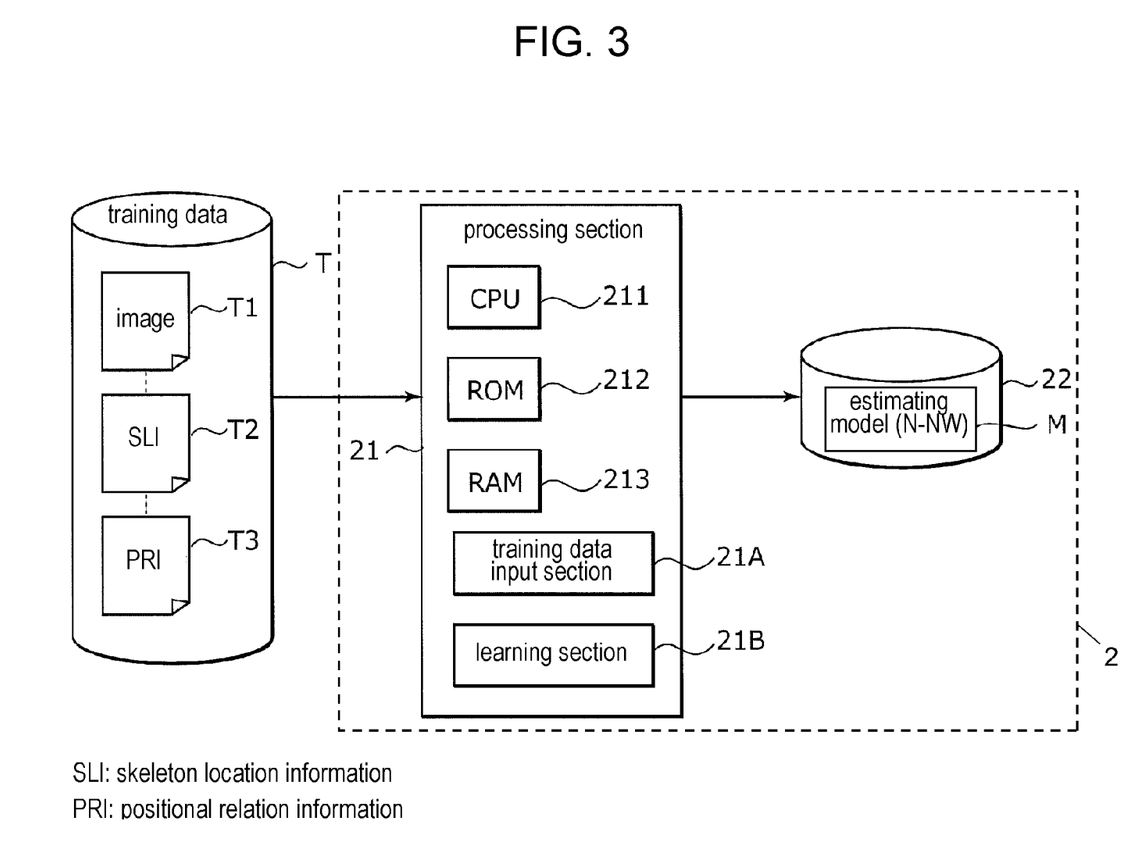
FIG. 3 shows an example of a learning device for forming an estimating model.

FIG. 3 shows an example of a structure of learning device 2 that forms estimating model M. Learning device 2 includes processing section 21 and storage section 22. Descriptions of the parts of the above structure, which are common to processing section 11 and storage section 12 of estimating device 1 are omitted. Processing section 21 includes CPU 211 working as a computation/control device, ROM 212 working as a main storage device, and RAM 213.

Processing section 21, for instance, executes the learning program, thereby working as training data input section 21A (hereinafter referred to as an input section) and learning section 21B. To be more specific, processing section 21 carries out learning with a teacher using training data T, and forms estimating model M.

Training data T includes image T1, first information T2, and second information T3. Image T1 contains an image of equipment (e.g. steering wheel) of a vehicle and an image of a vehicle-occupant's specific part (e.g. hand). As discussed previously, first information T2 is the skeleton location information of the vehicle-occupant's specific part (e.g. hand), and second information T3 is positional relation information showing the positional relation between the equipment and the specific part.

Image T1 is associated with first information T2 and second information T3, and these materials, as one set, form training data T. Image T1 is an input of estimating model M, and the first and second information T2, T3 are outputs of estimating model M. Image T1 can contain only the image of equipment (which does not contain the image of the specific part of the vehicle-occupant).

First information T2 is given as coordinates (x, y) that shows the skeleton location of the specific part in image T1. Second information T3 is given as ON/OFF. To be more specific, when second information T3 is given as ON, information T3 indicates that the hand is overlaid upon the equipment (or the hand touches the equipment). When second information T3 is given as OFF, information T3 indicates that the hand is off (or separated from) the equipment.

Image T1 of training data T can be an entire image of the image shot by in-vehicle camera 20, or it can be a partial image equal to a cutout image from the entire image.

In the case of using the image, as it is, shot with in-vehicle camera 20 as an input to estimating model M in estimating device 1, the entire image is prepared to be image T1 of training data T, and first information T2 is given as the coordinates on the entire image. In the case of using the cutout image from the image shot with in-vehicle camera 20, as an input to estimating model M in estimating device 1, a partial image is prepared to be image T1 of training data T, and first information T2 is given as the coordinates on the partial image. In other words, image T1 of training data T during the learning and the image to be used as the input to estimating model M desirably have the same target area (image size and location) to be processed.

FIGS. 4A to 4I show an example of a set of training data T for forming estimating model M that estimates the state of the steering wheel held by the vehicle-occupant. FIGS. 4A to 4I illustrate that the positional relation between the hand and the steering wheel varies due to differences in size of the steering wheel even when the skeleton of the hand stays at the same location. Note that FIGS. 4A to 4I represent a case in which partial images each showing a vicinity of the steering wheel is used as images T1 of training data T.

Figure 4A:
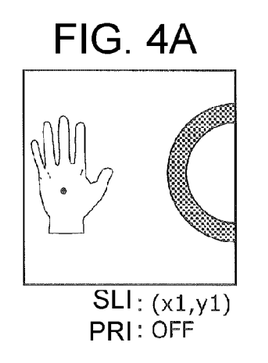
FIGS. 4A to 4I show an example of a set of training data to be used when an estimating model is formed for estimating how a vehicle-occupant holds a steering wheel.
Figure 4B:
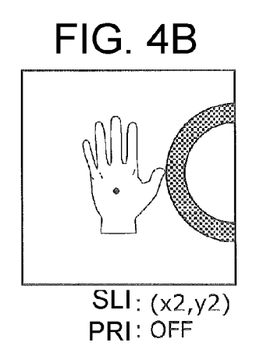
Figure 4C:
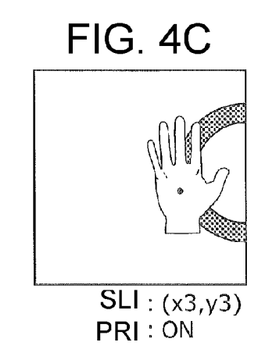
Figure 4D:
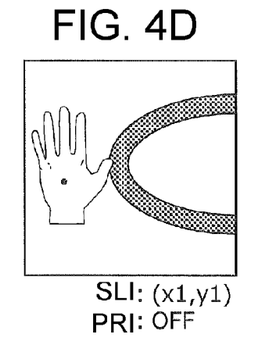
Figure 4E:
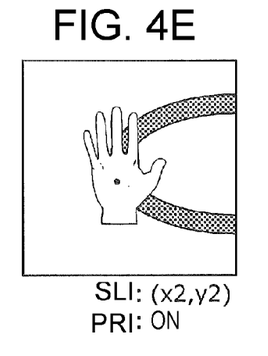
Figure 4F:
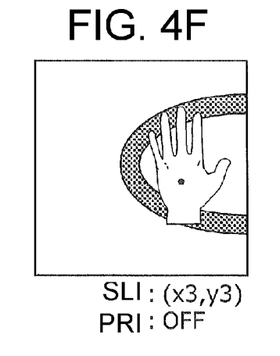
Figure 4G:
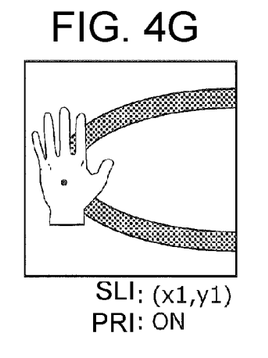
Figure 4H:
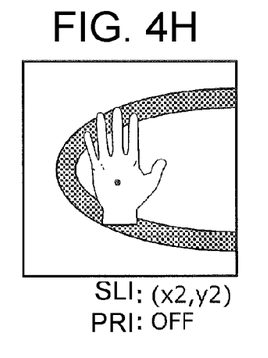
Figure 4I:
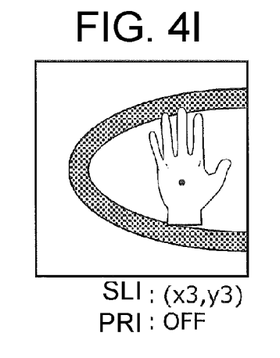

In each of images T1 shown in FIGS. 4C, 4E, and 4G, the hand is overlaid on the steering wheel (the hand touches the steering wheel), so that images T1 shown in FIGS. 4C, 4E, and 4G are associated with "ON" as second information T3. As first information T2, coordinates (x3, y3), (x2, y2) and (x1, y1) each of which shows the skeleton location of the hand are associated with images T1, respectively. In the images T1 other than images T1 shown in FIGS. 4C, 4E, and 4G, the hand is off the steering wheel, so that these images T1 are associated with "OFF" as second information T3. As first information T2, the coordinates that show the respective skeleton locations of the hand are associated with these images T1.

Images T1 of training data T contain various patterns of images supposed to be shot with in-vehicle cameras 20 mounted to at least two models of vehicle, where these two models of vehicle include equipment different in size and/or location from each other. To be more specific, a large amount of images, in which different types (position, size, pattern thereon, etc.) of steering wheel and/or different locations of hand have been shot, is prepared as images T1 of training data T. Each of these images T1 is associated with first information T2 and second information T3. Preparing images T1 as many as possible will increase the accuracy of estimation done by estimating model M.

Figure 5:
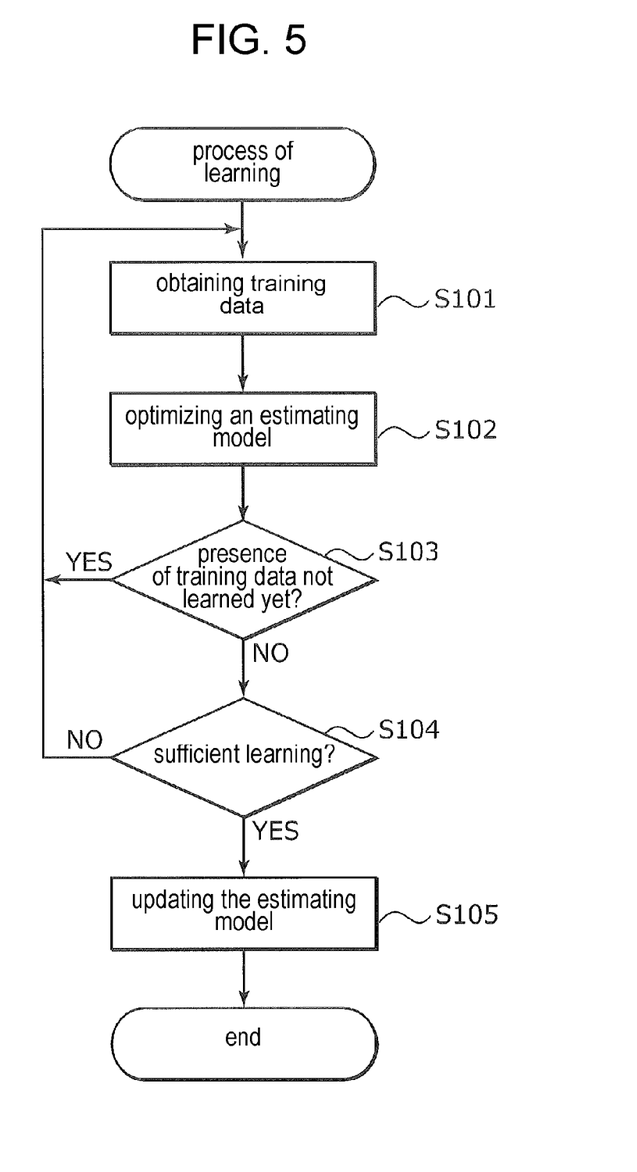
FIG. 5 is a flowchart showing an example of a learning process executed by a processing section of a learning device.

FIG. 5 is a flowchart describing an example of a learning process executed by processing section 21 of learning device 2. This process can be implemented through an execution of the learning program by CPU 211.

In step S101, processing section 21 obtains one set of training data T (as a process of input section 21A). Training data T contains image T1, first information T2, and second information T3.

In step S102, processing section 21 optimizes estimating model M based on the obtained training data T (as a process of learning section 21B). To be more specific, processing section 21 reads a present estimating model M from storage section 22, and modifies (reforms) estimating model M such that the output values produced when image T1 is input to model M becomes equal to the values of first and second information T2 and T3 associated with image T1. For instance, a coupling strength (parameter) between nodes that form the neural network is modified in the deep learning that uses the neural network.

In step S103, processing section 21 determines whether or not training data T not yet learned is available. In the case when training data T not yet learned is found (YES in step S103), the process moves to step S101, so that the learning of estimating model M is repeated, and the accuracy of estimating the state of vehicle-occupant with estimating model M can be increased. On the other hand, in the case when training data T not yet learning is not found (NO in step S103), the process moves to step S104.

In step S104, processing section 21 determines whether or not the learning is sufficiently done. For instance, processing section 21 uses an average value of square-error as a loss function, and when the average value is equal to or less than a predetermined threshold, processing section 21 determines that the learning has been sufficiently done. To be more specific, processing section 21 calculates the average values of respective square-errors between the output values produced when image T1 is input into estimating model M, and the values of the first and second information T2, T3 associated with image T1. Processing section 21 determines whether or not the average values are equal to or less than the respective predetermined thresholds.

When processing section 21 determines that the learning has been sufficiently done (YES in step S104), the process moves to step S105. When processing section determines that the learning is not sufficiently done yet (NO in step S104), the step repeats the processes from step S101 to step S104.

In step S105, processing section 21 updates estimating model M stored in storage section 22 based on the result of learning.

As discussed above, learning device 2 forms estimating model M to be used for estimating the state of the vehicle-occupant (e.g. state of holding the steering wheel) with respect to the equipment (e.g. steering wheel) of the vehicle. Learning device 2 includes input section 21A that works as a training data input section, and learning section 21B. Input section 21A obtains training data T in which image T1 containing an image of equipment, first information T2 that indicates a skeleton location of a specific part of a vehicle-occupant, and second information T3 that indicates a state of the vehicle-occupant with respect to the equipment are associated with each other. When image T1 is input into estimating device 1, learning section 21B forms estimating model M such that estimating device 1 can obtain first information T2 and second information T3 both associated with image T1.

Use of estimating model M formed by learning device 2 allows estimating device 1 to estimate accurately, based on the image supplied from in-vehicle camera 20, the positional relation between the equipment (e.g. steering wheel) and the specific part (e.g. hand), viz. the state of the vehicle-occupant with respect to the equipment. The equipment of the vehicle such as a steering wheel slightly differs from each other model by model; nevertheless, they are similar to each other in every aspect including a setting location. Learning device 2 is thus able to learn the positional relation between the equipment of the vehicle and the specific part of the vehicle-occupant in a generalized manner.

For instance, when the image shot by in-vehicle camera 20 shows that an arc-shaped subject like a steering wheel extends from the hand, and yet, the skeleton location of the hand is in a region where the steering wheel can be set, "ON" is output as the second information. On the other hand, although the arc-shaped subject like the steering wheel extends from the hand, the skeleton location of the hand is absent from the region where the steering wheel can be set, "OFF" is output as the second information.

The output from estimating device 1 needs to include the information about the state of the vehicle-occupant with respect to the equipment, viz. the second information that shows the positional relation between the equipment and the specific part. Therefore it is presumable that an estimating model, formed by a machine learning that uses training data in which an image is associated with only the second information, is used for estimating vehicle-occupant's state with respect to the equipment. In this case, however, if the image supplied from in-vehicle camera 20 shows the arc-shaped subject like a steering wheel extending from the hand although the hand does not actually holds the steering wheel, "ON" may be output as the second information, which is an erroneous estimation. Estimating model M in accordance with this embodiment learns not only the positional relation between the steering wheel and the hand of the vehicle-occupant, but also the skeleton location of the hand, so that the state of steering wheel held by the vehicle-occupant can be accurately estimated.

Learning device 21B can form estimating model M with a deep learning that uses the neural network.

The learning method implemented by learning device 2 forms the model to be used in the estimating method that estimates the state of the vehicle-occupant with respect to the equipment of the vehicle. This learning method obtains training data T in which image T1 containing an image of the equipment, first information T2 indicating the skeleton location of the specific part of the vehicle-occupant, and second information T3 indicating the state of the vehicle-occupant with respect to the equipment are associated with each other (refer to step S101 in FIG. 5). Then this learning method forms estimating model M such that the estimating method can obtain first information T2 and second information T3 associated with image T1 (refer to steps S102 to S105 in FIG. 5).

The non-transitory computer readable medium stores the learning program to be executed by the computer in learning device 2 that forms estimating model M used in estimating device 1. This learning program causes the computer to execute a process of obtaining training data T (refer to step S101 in FIG. 5), and a process of forming estimating model M (refer to steps S102 to S105 in FIG. 5). In training data T, image T1 containing the image of the equipment, first information T2 indicating the skeleton location of the specific part of the vehicle-occupant, and second information T3 indicating the state of the vehicle-occupant with respect to the equipment are associated with each other. Estimating model M is formed such that estimating device 1 can obtain first information T2 and second information T3.

Figure 6:
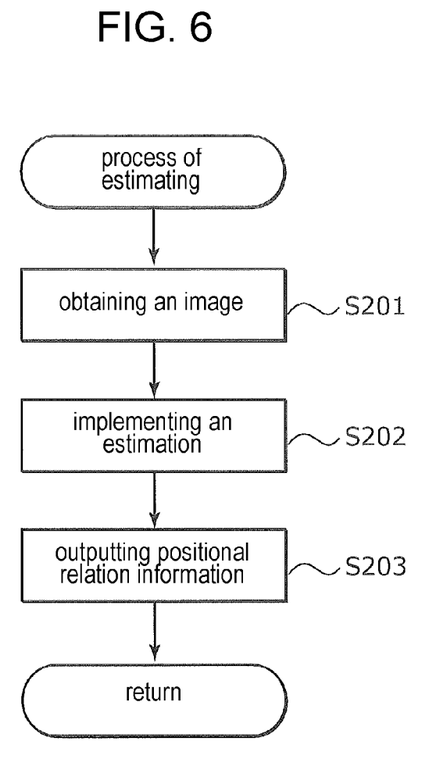
FIG. 6 is a flowchart showing an example of an estimating process executed by a processing section of an estimating device.

FIG. 6 is a flowchart showing an example of the estimating process executed by processing section 11 of estimating device 1 shown in FIG. 2. The execution of the estimating program with CPU 111 will implement this process. In-vehicle camera 20 feeds processing section 11 with image DI frame by frame sequentially.

In step S201, processing section 11 obtains image DI from in-vehicle camera 20 (as a process of image input section 11A).

In step S202, processing section 11 estimates the state of the vehicle-occupant by using obtained image DI and estimating model M (as a process of estimator 11B). Processing section 11 outputs, as a result of the estimation, first information DO1 (the skeleton location information) and/or second information DO2 (the positional relation information).

In step S203, processing section 11 outputs second information DO2 (as a process of estimation result output section 11C) as a result of estimating the state of the vehicle-occupant with respect to the equipment. The processes discussed above are done to each frame of image DI. Second information DO2 supplied from estimating device 1 as the estimation result will be used, for instance, in a state detecting device (including an application program) disposed in a later stage of estimating device 1. The state detecting device implements an appropriate process in response to the state of the vehicle-occupant with respect to the equipment. For instance, in the case of obtaining the estimation result of not-holding the steering wheel, a process of providing the vehicle-occupant with a warning of 'hold the steering wheel!' can be implemented.

As discussed above, estimating device 1 estimates the state of the vehicle-occupant with respect to the equipment of the vehicle. Estimating device 1 includes storage section 12 and processing section 11. Storage section 12 stores estimating model M formed through machine learning done by learning device 2. Processing section 11 obtains image DI containing the image of the equipment, and then estimates the state of the vehicle-occupant by using image DI and estimating model M. Furthermore, processing section 11 outputs first information DO1 and second information DO2 as a result of estimation. First information DO1 indicates the skeleton location of the specific part of the vehicle-occupant, and second information DO2 indicates the state of the vehicle-occupant with respect to the equipment.

Processing section 11 can recognize at least any of the following articles as the equipment of the vehicle: a steering wheel, a touch panel of a car-navigation system, windows, door handles, a control panel for an air-conditioner, a rear-view mirror, a dash board, seats, arm rests, a center compartment, and a glove compartment.

Furthermore, an estimating system can be formed of estimating device 1 and in-vehicle camera 20. In this case, camera 20 can be placed in order to shoot the image containing the image of the equipment disposed within a given region in the interior of the vehicle.

The estimating method carried out in estimating device 1 estimates the state of the vehicle-occupant with respect to the equipment of the vehicle. According to this method, image DI in which the equipment is shot is firstly obtained (refer to step S201 shown in FIG. 6), and then the state of the vehicle-occupant with respect to the equipment is estimated by using obtained image DI and estimating model M formed by the machine learning in learning device 2 (refer to step S202 in FIG. 6). Then first information DO1 indicating the skeleton location of the specific part of the vehicle-occupant, and second information DO2 indicating the state of the vehicle-occupant with respect to the equipment are output as a result of the estimation (refer to step S203 in FIG. 6).

The storage medium (i.e. non-transitory computer readable medium) stores an estimating program to be executed by processing section 11 (i.e. computer) of estimating device 1 that estimates the state of the vehicle-occupant with respect to the equipment of the vehicle. The estimating program causes processing section 11 to implement the following processes: the process of obtaining image DI containing the image of the equipment (refer to step S201 in FIG. 6), the process of estimating the state of the vehicle-occupant with respect to the equipment (refer to step S202 in FIG. 6), and the process of outputting first information DO1 and second information DO2 as the result of estimation (refer to step S203 in FIG. 6). For the estimation of the state of the vehicle-occupant with respect to the equipment, obtained image DI and estimating model M formed by the learning program stored in the storage medium discussed above are employed.

Estimating device 1 discussed above is applicable to any vehicles regardless of their specifications, and allows estimating the state of the vehicle-occupant with respect to the equipment accurately. To be more specific, estimating device 1 does not need dedicated data to vehicles model by model unlike conventional equipment information. In other words, estimating model M has learned the skeleton location of the specific part of the vehicle-occupant, and the positional relation between the specific part and the equipment independently, so that estimating device 1 is applicable with ease to vehicles of which equipment is different in size and mounted at different places in each model of vehicles. Comparing with the conventional equipment information, estimating model M has a smaller amount of data, so that the estimation process can be done at a higher speed than before.

As discussed previously, the present disclosure is demonstrated specifically based on the exemplary embodiment, nevertheless the present disclosure is not limited to the embodiment and can be modified within the scope not deviating from the gist of the disclosure.

For instance, the estimating device is able to estimate not only the state of steering wheel held by a vehicle-occupant, but also the state of the vehicle-occupant with respect to other equipment. This estimating device is able to estimate, for instance, the operation of the navigation system, the action of opening/closing the window, and the action of opening/closing the door, done by the vehicle-occupant. In each of these cases, another estimating model is needed, and this estimating model outputs, in response to an input of an image, the state of the vehicle-occupant with respect to each of the foregoing equipment.

The estimating device allows the second information, which indicates the positional relation between the equipment and the specific part of the vehicle-occupant, to further include a direction for estimating the specific part to be away in which direction from the equipment.

Estimating model M can be formed by machine learnings other than the deep learning (e.g. random forest).

The embodiment disclosed above should be construed as an example in every point, and indicating no limitation. The scope of the present disclosure is not shown in the above description, but is shown in the scope of the claims described hereinafter. The present disclosure can be modified within the scope of the claims and the scope equivalent thereto.

The present disclosure is thus suitable not only for the equipment in the interior of vehicle but also for an estimating device, learning device, estimating method, and estimating program that estimate person's state (posture and action) with respect to a specific section.

What is claimed is:

1. A learning device configured to form a model to be used in an estimating device configured to estimate a state of a vehicle-occupant with respect to equipment of a vehicle, the learning device comprising:
    a memory storing instructions; and
    a processor, when executing the instructions stored in the memory, that performs operations including:
    obtaining training data for a deep-learning that uses a neural network, the training data including an image and two labels to be learned in the deep-learning attached to the image, the image including a vicinity of a steering wheel, one of the two labels attached to the image being first information indicating two dimensional coordinates of a skeleton location of a hand of the vehicle-occupant in the image, another of the two labels attached to the image being second information including "ON" or "OFF" indicating the state of the vehicle-occupant with respect to the steering wheel, the "ON" indicating that the hand of the vehicle-occupant touches the steering wheel and the "OFF" indicating that the hand of the vehicle-occupant is separated from the steering wheel; and
    forming the model through the deep-learning that uses the neural network such that the model learns and outputs both of the two labels of the first information and the second information attached to the image including the vicinity of the steering wheel.

2. An estimating device configured to estimate a state of a vehicle-occupant with respect to equipment of a vehicle, the estimating device comprising:
    a storage configured to store the model formed by the learning device as defined in claim 1;
    a memory storing instructions; and
    a processor, when executing the instructions stored in the memory of the estimating device, that performs operations including:
    obtaining an image including a vicinity of the steering wheel,
    estimating the state of the vehicle-occupant based on the obtained image including the vicinity of the steering wheel and the model, and
    outputting the two labels of the first information and the second information as an estimating result.

3. The estimating device according to claim 2, wherein the processor of the estimating device recognizes at least one of a steering wheel.

4. The estimating device according to claim 3, wherein the processor of the estimating device further recognizes at least one of a touch panel of a car navigation system, a window, a door handle, a control panel for an air-conditioner, a rear-view mirror, a dashboard, a seat, an arm rest, a center compartment, and a glove compartment as the equipment.

5. An estimating system configured to estimate a state of a vehicle-occupant with respect to equipment of a vehicle, the estimating system comprising:
    a camera configured to shoot an image including a vicinity of a steering wheel; and
    the estimating device as defined in claim 3,
    wherein the processor of the estimating device obtains the image including the vicinity of the steering wheel from the camera.

6. The estimating system according to claim 5, wherein the camera is configured to shoot an image including the vicinity of the steering wheel disposed within a given region in an interior of the vehicle.

7. The learning device according to claim 1, wherein the processor forms the model by:
    inputting the image including a vicinity of a steering wheel in the training data to the model;
    obtaining the two labels of the first information and the second information output by the model;
    modifying and optimizing the model such that the two labels of the first information and the second information output by the model respectively match the two labels of the first information and the second information included in the training data.

8. A learning method for forming a model to be used in an estimating method for estimating a state of a vehicle-occupant with respect to equipment of a vehicle, the learning method comprising:
    obtaining training data for a deep-learning that uses a neural network, the training data including an image and two labels to be learned in the deep-learning attached to the image, the image including a vicinity of a steering wheel, one of the two labels attached to the image being first information indicating two dimensional coordinates of a skeleton location of a hand of the vehicle-occupant in the image, another of the two labels attached to the image being second information including "ON" or "OFF" indicating a state of the vehicle-occupant with respect to the steering wheel, the "ON" indicating that the hand of the vehicle-occupant touches the steering wheel and the "OFF" indicating that the hand of the vehicle-occupant is separated from the steering wheel; and
    forming the model through the deep-learning that uses the neural network such that both of the two labels of the first information and the second information attached to the image including the vicinity of the steering wheel are learned by and output from the model in the estimating method.

9. An estimating method for estimating a state of a vehicle-occupant with respect to equipment of a vehicle, the estimating method comprising:
    obtaining an image including a vicinity of the steering wheel;
    estimating the state of the vehicle-occupant with respect to the steering wheel by using the obtained image including the vicinity of the steering wheel and the model formed by the learning method as defined in claim 7; and
    outputting two labels of the first information and the second information as an estimating result.

10. A learning-program storage medium storing a learning program to be executed by a computer of a learning device for forming a model to be used in an estimating device for estimating a state of a vehicle-occupant with respect to equipment of a vehicle, and the storage medium being a non-transitory storage medium,
    wherein the learning program causes the computer to execute:
    a process of obtaining training data for a deep-learning that uses a neural network, the training data including an image and two labels to be learned in the deep-learning attached to the image, the image including a vicinity of a steering wheel, one of the two labels attached to the image being first information indicating two dimensional coordinates of a skeleton location of a hand of the vehicle-occupant in the image, another of the two labels attached to the image being second information including "ON" or "OFF" indicating a state of the vehicle-occupant with respect to the steering wheel, the "ON" indicating that the hand of the vehicle-occupant touches the steering wheel and the "OFF" indicating that the hand of the vehicle-occupant is separated from the steering wheel, and a process of forming the model through the deep-learning that uses the neural network such that the model learns and outputs both of the two labels of the first information and the second information attached to the image including the vicinity of the steering wheel.

11. An estimating-program storage medium for storing an estimating program to be executed by a computer of an estimating device for estimating a state of a vehicle-occupant with respect to equipment of a vehicle, and the storage medium being a non-transitory storage medium, wherein the estimating program causes the computer to execute:

a process of obtaining an image including a vicinity of the steering wheel, a process of estimating the state of the vehicle-occupant with respect to the hand by using the obtained image including the vicinity of the steering wheel and the model formed by the learning program stored in the learning-program storage medium as defined in claim 9, and a process of outputting the two labels, the two labels being the first information indicating two dimensional coordinates of the skeleton location of the hand of the vehicle-occupant and the second information including "ON" or "OFF" indicating the state of the vehicle-occupant with respect to the equipment steering wheel as an estimating result.

* * * * *